Inventor,
Sidney R. Smith, Jr.,
by [signature]
His Attorney.

Inventor,
Sidney R. Smith, Jr.
by (signature)
His Attorney.

Feb. 24, 1970  S. R. SMITH, JR  3,497,764
OVERVOLTAGE PROTECTIVE APPARATUS HAVING A PILOT GAP
CIRCUIT ARRANGEMENT FOR CONTROLLING
ITS ACTUATION
Filed Sept. 25, 1967  4 Sheets-Sheet 4

Inventor,
Sidney R. Smith, Jr.
by
His Attorney.

United States Patent Office 3,497,764
Patented Feb. 24, 1970

3,497,764
OVERVOLTAGE PROTECTIVE APPARATUS HAVING A PILOT GAP CIRCUIT ARRANGEMENT FOR CONTROLLING ITS ACTUATION
Sidney R. Smith, Jr., Myrtle Beach, S.C., assignor to General Electric Company, a corporation of New York
Filed Sept. 25, 1967, Ser. No. 670,297
Int. Cl. H02h 1/04, 7/16
U.S. Cl. 315—37                                    6 Claims

ABSTRACT OF THE DISCLOSURE

A main power gap has a combined heat shield and arc controlling trigger electrode, there being a resistive voltage grading network connected between the main electrodes and the trigger electrode, with an accurately calibrated voltage responsive pilot gap connected between one main electrode and the trigger electrode.

---

This invention relates to overvoltage protective apparatus and more particularly to rugged high power automatically fast acting static gap apparatus of this kind.

Although not limited to such use, the invention is particularly intended as back-up protection for a series capacitor bank in a high voltage power transmission line. By back-up protection is meant a secondary or tertiary line of defense against the application of insulation damaging overvoltage, which in the case of a series capacitor is usually caused by line fault surge currents which may have a long duration compared to a cycle of the normal current frequency. In one such installation, the primary and secondary protective devices are respectively a triggered vacuum gap which is very accurately calibrated and very fast acting but which is relatively delicate and has a short time current rating and a vacuum switch with a movable contact which is closed by current in the vacuum gap. These primary and secondary devices are designed to be self-restorative following a line fault. However, because of the very high cost of the series capacitors in an EHV or UHV power system it is considered desirable to have additional tertiary back-up protection which, although set at a slightly higher voltage response level, is capable of providing positive overvoltage protection. When and if this back-up protection apparatus does operate, it or other portions of the protective gear may require maintenance work before power can be restored to the particular capacitors which it protects.

The principal feature of the invention is a three electrode power gap in which the third or trigger electrode is so shaped as not only to act as a heat shield between the power arc and the housing but also to control and move arcs struck between it and the main electrodes so as quickly to combine them into a single power arc between the main electrodes.

Another feature of the invention is control elements and circuitry for the main third electrode power gap.

An object of the invention is to provide overvoltage protective apparatus.

Another object of the invention is to provide a three electrode power gap in which one electrode is a trigger electrode so shaped as to constitute a heat shield and also a means for moving and rapidly combining arcs struck between it and the main electrodes into a single power arc between the main electrodes.

A further object of the invention is to provide backup over-all voltage protective apparatus for series capacitors.

An additional object of the invention is to provide auxiliary voltage grading and pilot gap means for producing accurately calibrated positive sparkover of a main three electrode gap in response to overvoltage.

The invention will be better understood from the following description taken in connection with the accompanying drawings and its scope will be pointed out in the appended claims.

Figure 1:
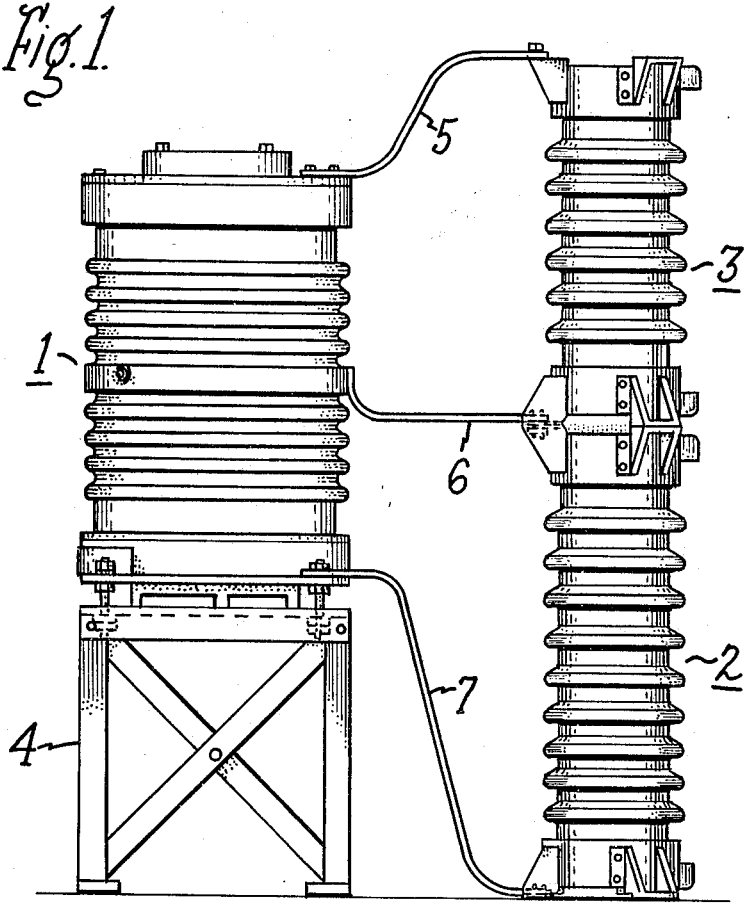
Figure 2:
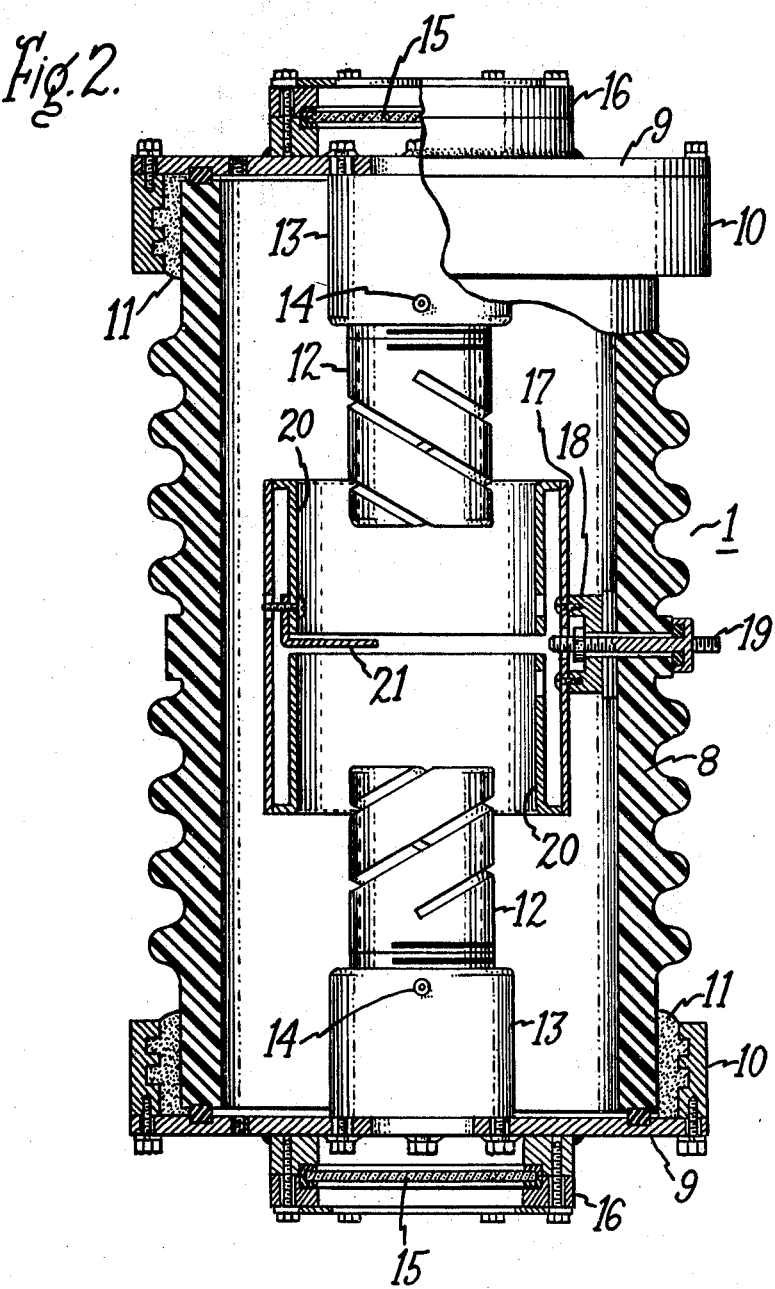
Figure 3:
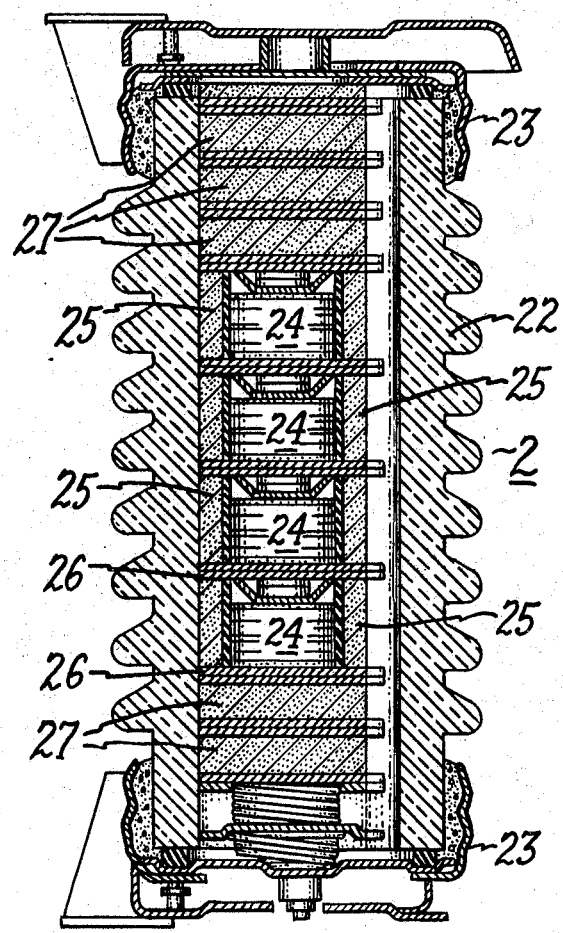
Figure 4:
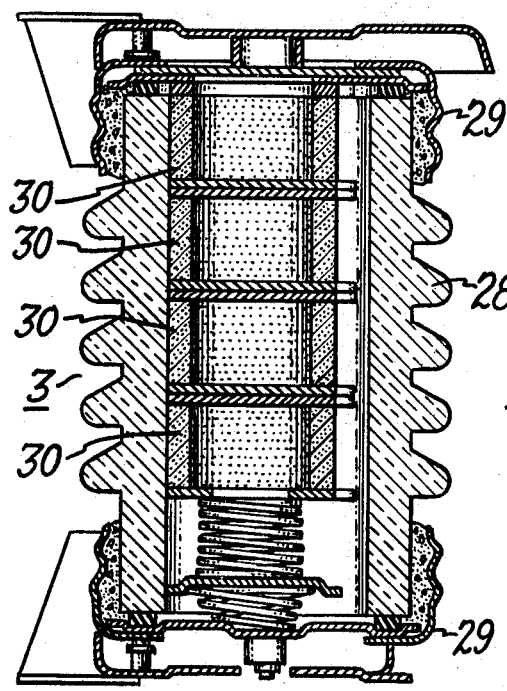
Figure 5:
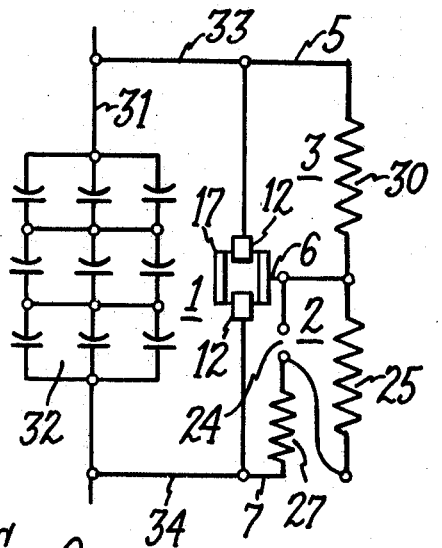
Figure 6:
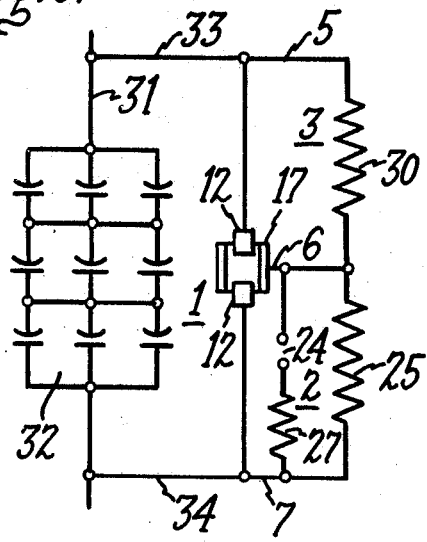

In the drawings,
FIG. 1 is an elevation view of an embodiment of the invention,
FIG. 2 is a broken away part sectional view of the main gap unit of FIG. 1,
FIG. 3 is a broken away part sectional view of the pilot gap unit of FIG. 1,
FIG. 4 is a broken away part sectional view of the grading resistor unit of FIG. 1,
FIG. 5 is a circuit diagram of the embodiment shown in FIG. 1, and
FIG. 6 is a circuit diagram of a modification.

Referring now to the drawings and more particularly to FIG. 1, the protective apparatus is shown as comprising a main gap unit 1, a pilot gap unit 2 and a grading resistor unit 3. The main gap unit 1 is shown mounted on a suitable support or stand 4 and the grading resistor unit is shown stacked on top of the pilot gap unit 2 placed along side the main gap unit 1 with electrical connections 5, 6, and 7 and extending between the units so that connector 5 connects one end of the main gap to one end of the grading resistor. Connector 6 connects the function of the units 2 and 3 to an intermediate terminal of the main gap 1 and the connector 7 connects the other end of the main gap to the other end of the pilot gap unit.

Referring now to FIG. 2, the main gap unit 1 comprises a hollow insulator housing 8 which conveniently may be a circular cylinder of porcelain or other suitable material having alternate external circumferential ridges and depressions for increasing electrical creep strength between its ends which consist essentially of metallic caps 9 which may be duplicates and which are bolted to rings 10 attached by means of cement 11 to the housing. Each end cap 9 carries an inwardly extending axially positioned main electrode 12 which is hollow and spirally slotted as shown. It may be threaded into a socket 13 and locked thereto by means of a set screw 14. In this manner the axial operation of the adjacent ends, i.e. the length of the gap between the main electrodes may be adjusted. Each cap 9 has a central opening closed by a frangible pressure relief diaphragm 15 seated in suitable mounting means 16. Diaphragms 15 are preferably of transparent glass to not only provide normal sealing and reliable venting at low pressures resulting from operation but also the ability to inspect the interior visually without dismantling.

Symmetrically positioned with respect to the main electrodes 12 and coaxially surrounding their ends is a combined heat shield and trigger electrode 17 which is attached by means of a suitable bracket 18 to the inner wall of the housing 1 through which extends a third or intermediate terminal 19. It will be seen that the shield 17 is positioned between the inner wall of the housing 1 and the main gap space so that it acts as a heat shield for the housing 1. Shield 17 is also provided at each of its ends with an inturned or reentrant lip portion 20 for controlling and moving and combining arcs struck between the trigger electrode 17 and either or both of the main electrodes 12. If desired or necessary, a pointed conductive spike 21 may be attached to the shield and extend into the space between the main electrodes, this being for the purpose of providing ionization and more reliable sparkover between the trigger electrode 17 and one or the other of the main electrodes with respect to which the trigger electrode has a negative potential.

The interior of the main gap unit 1 may be either at atmospheric pressure although this is not essential or the pressure may be anything desired either above or below atmospheric pressure and the gas or vapor may or may not be air.

Referring now to FIG. 3, the pilot gap unit 2 is structurally similar to a valve type lightning arrester. It comprises a housing 22 of generally cylindrical form whose ends are closed by conductive caps 23. Inside the housing is a column of conductive elements extending between the end caps. These elements are gap units 24 each surrounded by an annular grading resistor 25, each pilot gap unit 24 and its surrounding grading resistor 25 being mounted on conductive plates 26 so that they are in parallel with each other and each parallel path is in series with another parallel path. At the ends of the stack are a plurality of resistor discs 27 also mounted between conductive plates or having conductive surfaces so that they are connected electrically in series with each other and with the series parallel arrangement of pilot gap units 24 and grading resistors 25. Although not shown, it will be understood that, as in lightning arrester applications, the pilot gap units 24 are preferably provided with preionizers of any suitable type so as to provide accurate and reliable sparkover.

Referring to FIG. 4, the grading resistor unit 3 consists of a housing 28 which although somewhat shorter is otherwise similar to the housing 22 of the pilot gap unit. It is provided with conductive end caps 29 and extending therebetween within the housing 28 are annular grading resistors 30 similar to the resistors 25 in FIG. 3, there being like numerals in each figure.

The resistance of the grading resistors 25 and 30 is preferably but not necessarily the same and is very much higher than the resistance of the current limiting resistors 27. All the resistors are preferably of the nonlinear valve type in which resistance is an inverse function of voltage or current.

In the circuit diagram shown in FIG. 5, there is a main conductor 31 such as a power conductor of an EHV or UHV electric power transmission line in which there is a series capacitor bank 32. The protective apparatus of the present invention is connected across the series capacitor bank 32 by means of conductors 33 and 34, the resistance 27 being very much less than the resistance of the resistors 25 and 30. The voltage of the trigger electrode 17 is maintained substantially midway between the voltages of the main electrodes 12 of the main gap. If and when the voltage across the series capacitor reaches a dangerously high value, the sparkover voltage of the pilot gap 24 will be attained and the pilot gap 24 will sparkover thus in effect short circuiting the resistor 25 and impressing substantially all of the series capacitor voltage between the trigger electrode 17 and the upper main electrode 12 thus causing sparkover in the main gap between the trigger electrode 17 and the upper electrode 12. This in effect short circuits resistor 30 so that all of the capacitor voltages are then between the trigger electrode 17 and the lower main electrode 12 which will then immediately spark over.

Referring to FIG. 2, it will be seen that for any arc that is struck between a main electrode 12 and the trigger electrode 17 that the inturned or reentrant curvature of the lip portion 20 in combination with the main electrode 12 constitutes a nonlinear current path feeding the arc such that a loop is provided which by electromagnetic action forces the arc inwardly toward the center of the shield 17, the root of the arc on the shield moving downward to the end of the lip. In this manner, both arcs to the shield will almost instantaneously combine and leave the shield or trigger electrode to form the main power arc between the electrodes 12. The spiral slotting of the main electrodes also causes the current feeding the arc to have a direction which is not parallel to the axis of the main electrodes so as to form another current loop causing a tangential force on the arc root at the end of the main electrode thus spinning the arc around the periphery of the end of the main electrode and preventing it from burning the main electrode as it otherwise would do if it stayed in the same spot. By having the main gap enclosed its sparkover is much less erratic and the arc does not wander as much as it would if the main gap were open to the atmosphere. Thus enclosing the main gap gives better control all around and also the gas density is essentially constant with variations in temperature, humidity and barometric pressure all of which contribute to more reliable operation than if the gap were in open air. However, even so, the main gap sparkover would not be exact enough or consistent enough to protect the very expensive series capacitors and to coordinate with the sparkover characteristics of the primary and secondary protective devices mentioned earlier. It has been found that the pilot gap and grading resistor combination, operating as described above, do cause the main gap to spark over and conduct within a very close voltage tolerance or variation. In other words, the basic function of the pilot gap and grading resistor combination is to cause the main gap to sparkover in a narrow and predetermined voltage range.

Returning now to FIG. 5, the resistor 27 in effect protects the gap 24 from carrying excessive current. Once the gap 24 is sparked over, the time to form an arc path between electrodes 12 is negligible, being in the order of microseconds or less. During the short arc formation or transition period, the resistor 27 limits the pilot gap current which might otherwise flow due to the arc voltage it is subjected to. Once the main power arc is established between the main electrodes 12 there is insufficient voltage to maintain the arc in the pilot gap 12 and it is extinguished.

It is not essential to have the grading resistor 25 and the current limiting resistor 27 in series circuit relation and in the modification shown in FIG. 6 they are connected in parallel circuit relation with the gap 24 in series with the current limiting resistor 27. The latter circuit has the advantage that the potential of the trigger electrode 17 maintained by the grading network of the resistors 25 and 30 is independent of the resistance of the current limiting resistor 27 so that, for example, if resistors 25 and 30 are equal the potential of the trigger electrode 17 will be maintained exactly midway between the potential of the main electrodes 12. However, as previously pointed out the circuit of FIG. 5 is entirely satisfactory because the resistance of the current limiting resistor 27 being so much less than the resistance of the resistors 25 and 30 it does not materially affect the operation of the voltage grading network.

In addition to its function as a heat shield for protecting the housing 8 and also its function as a trigger electrode, the element 17 has an additional function of minimizing condensation of metal vapor from the main electrodes on the inner wall of the insulating housing 8. Such condensation would, of course, materially impair the effectiveness of the housing 8 as an insulator between the conductive end caps 9–10 which are subjected to very substantial differences in potential.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. Overvoltage protective apparatus comprising, in combination, a backup gap having a pair of main electrodes and a trigger electrode, a first high resistance voltage grading resistor connected between one main electrode and the trigger electrode, a pilot gap connected between the other main electrode and the trigger electrode, a second high resistance voltage grading resistor connected in shunt circuit relation with said pilot gap, and a low resistance pilot gap current limiting resistor connected in series circuit relation with said pilot gap, said current limiting resistor, pilot gap and first high resistance resistor being connected to form a series circuit the respective ends of which are shunt connected across said backup gap so that when said backup gap conducts the voltage across said current limiting resistor drops toward zero voltage.

2. Apparatus as in claim 1 in which all said resistors are nonlinear valve type resistors.

3. Apparatus as in claim 1 in which said current limiting resistor is in series with both said pilot gap and said second voltage grading resistor in parallel.

4. Apparatus as in claim 1 in which said second voltage grading resistor shunts both said pilot gap and said current limiting resistor in series.

5. Apparatus as in claim 1 including preionized means for preionizing said pilot gap.

6. Apparatus as in claim 5 wherein said preionizing means comprises a pointed conductive spike mounted adjacent said pilot gap and extending into the space between the pair of main electrodes, whereby both the pilot gap and the backup gap are preionized by said preionizing means.

References Cited

UNITED STATES PATENTS

| 2,797,368 | 6/1957 | Holden | 315—339 X |
| 3,377,503 | 4/1968 | Osterhout | 315—59 X |
| 3,413,524 | 11/1968 | Train | 317—69 |

JAMES W. LAWRENCE, Primary Examiner

E. R. LA ROCHE, Assistant Examiner

U.S. Cl. X.R.

315—352; 317—12, 69